3,421,953
CARBIDE DEPOSITION ON TANTALUM
Joseph C. McGuire, Kennewick, Wash., and Cornel Wohlberg, Los Alamos, N. Mex., assignors to the United States of America as represented by the United States Atomic Energy Commission
No Drawing. Filed Oct. 7, 1966, Ser. No. 586,007
U.S. Cl. 148—20.3        8 Claims
Int. Cl. C23f 7/00

The invention described herein was made in the course of, or under, a contract with the U.S. Atomic Energy Commission.

The present invention relates to a method of forming a carbide coating on metal and, more particularly, forming a surface layer of tantalum carbide on tantalum metal.

Liquid fuel reactors possess many advantages over solid fuel reactors such as reprocessing during operation and rapid change from a critical configuration to a noncritical configuration. Utilization of plutonium as a reactor fuel is advantageous when utilized in a breeding cycle. Consequently, a great deal of effort has been invested in the development of a molten plutonium reactor. It has been found quite difficult to find a material capable of containing the molten plutonium without excessive corrosion. Perhaps the most promising material is carbide coated tantalum metal. Since this coated tantalum is to be used as a structural material, it is highly desirable that the metal substrate retain its ductile characteristics.

In the past, the favored method of obtaining such carbide coated tantalum metal has been to pack the tubes with spectroscopic graphite powder and to heat them either in a vacuum or a graphite tube furnace in a helium atmosphere. This method was inconvenient, if not unfeasible, for long (24 in.) and particularly for narrow (length to inside diameter >10:1) tubes, for the following reasons.

(1) The carbon is difficult to pack into the tube so that adequate contact is maintained with the metal.

(2) It is difficult to remove occluded gases, not to mention "intercalated" oxygen and water. When a vacuum is applied, the gases inside usually spew the packed carbon out of the tube. The result is incomplete carbiding of the tube.

(3) The use of a graphite tube furnace obviates the last difficulty but usually results in a very heavy carbiding of the tube exterior, plus the pickup of oxygen by the tantalum.

(4) Carbiding with packed graphite in a hydrogen atmosphere (after some attempts at evacuation) still retains some of the drawbacks of incomplete oxygen removal, tedious packing procedure, incomplete carbiding and the usual difficulty of complete removal of the graphite powder.

(5) The packed carbon method has to be done at high temperatures, 1650–2100° C., to effect a solid-solid reaction. This results in excessive diffusion of carbon into the grains and grain boundaries and in uncontrolled grain growth.

It seems that the packed carbon method depends largely on gaseous transport of carbon for carbiding effectiveness. If a hydrocarbon gas is used for carbiding, the matter of "throwing power," or deposition at a distance and at some large angle from the source, becomes a problem.

In general, thermolytic cracking and deposition take place on the nearest hot surface. Putting a hydrogen atmosphere in contact with graphite will certainly be effective in creating hydrocarbon gases, but the times required for attaining equilibrium are long.

The invention described herein is based on the assumption that if an organic material can be thermally cracked in close proximity to the surface which is to be carbided, the problem of throwing power can be solved. Furthermore, enough material can be produced to carbide the surface at relatively low temperatures in a matter of minutes. In the case of tantalum this is of importance, since the rate of diffusion of carbon is rather high in tantalum. Since we wish to limit the carbon content of the grains and grain boundaries, it is desirable that both time and temperature be kept as low as possible. In accordance with the present invention the following general procedure is utilized:

(1) A porous rod of graphite is soaked with a hydrocarbon (or hydrocarbon containing chain) of fairly high molecular weight (at least 12 carbon atoms) such as diphenyl, erucic acid, etc.

(2) Insert the hydrocarbon containing rod into the tube. The diameter of the rod should preferably be as large as possible while permitting easy insertion and removal from the tube.

(3) The assembly of tantalum tube and hydrocarbon soaked graphite rod (with open end of tube somewhat restricted by a loose tantalum cap) is placed in a quartz tube.

(4) The quartz tube is evacuated. A partial pressure of 400 mm. hydrogen is then let in. The tantalum temperature is then raised to 1100° C. (about 2 minutes at 1100° C.). The temperature is then raised to 1650° C. and held for 15 minutes. Generally, the tube is then evacuated at temperature and allowed to cool.

A diffusion pump capable of taking the pressure down to $10^{-4}$ mm. is utilized and heating is performed with a high frequency converter of 6 kw. output equipped with a 6-in. coil.

The metal tubes to be coated are closed at one end either by welding or pinching off in a vise. The tantalum test tube utilized in these experiments is 0.375 in. inside diameter, 0.025 in. wall, and 5 in. long. The tubes are cleaned in a standard bright dip solution consisting of 20 ml. HF, 25 ml. $HNO_3$, 55 ml. $H_2SO_4$. Tubes are recleaned if they have not been used within a week.

Spectroscopic graphite rods (¼ in. diameter) long enough to fill the sample, are soaked in either the appropriate compound or a solution of the compound in acetone or toluene. After saturation, indicated by lack of bubble evolution, the rods are put into the tantalum tube. The end of the tantalum tube is loosely closed with a cap made of 1 mil Ta foil tied on with Ta wire. The assembly is then put into a 1-in. quartz tube that is connected to the vacuum line. After an evacuation time of five to ten minutes, a partial pressure of hydrogen, usually 400 mm., is admitted. The sample temperature is then raised to 1100° C. and held for 2 minutes after which the temperature is raised to 1650° C. and held for 15 minutes. The tube is then evacuated while at temperature and allowed to cool.

The best results are obtained with long chain and ring organic compounds, more particularly erucic acid (Cis-13 docosenoic acid, a long chain ($C_{22}$) fatty acid), and diphenyl, a chain of two benzene rings.

(A) Erucic acid.—Erucic acid is used as a representative long chain ($C_{22}$) fatty acid. The oxygens on the chain in all likelihood act as a focal point for the initiation of free radicals that would lead to a pyrolytic chain reaction via the reduction of an (OH) group, formation of double bonds and stepwise pyrolysis of the chain.

Table 1 shows the conditions used in carbiding a number of tantalum tubes with erucic acid. The coatings are relatively even and adherent. "Throwing power" or ability to penetrate cracks at some distance from the source is fairly good. The hardness for Run 1 varies from 125 to 196. Time of residence of the gases and possible temperature gradients determine diffusion of carbon (and oxygen) into the grains and hence its hardness. There is a correspondence between the visible carbides in the grains and microhardness.

(B) Rosin.—Some rosin is "run" at 250° C. for half an hour to distill out the more volatile components. A graphite rod is impregnated with the molten rosin and used to carbide a Ta tube. Table 1 describes the results. The carbide coating is similar to those made with erucic acid.

(C) Diphenyl: Diphenyl, a chain of two benzene rings, is known for rather high thermal stability, probably due to the resonance energy of the benzenoid structure. In fact, it is made at a temperature between 650–800° C. Diphenyl is used because of this high thermal stability. Decomposition occurs at temperatures close to those necessary for carbiding, i.e., ~1100° C. Table 2 shows the conditions of carbiding used and the results obtained with diphenyl. There is excellent throwing power, better uniformity of coating along the length of the tube, less penetration of carbide and possibly less absorption of oxygen. There is less of a spread in hardness readings (about 113 to about 140 in a typical case) along the length of the tube.

Table 3 shows that an addition of 10% diphenyl ether to diphenyl does not impair the coating properties greatly except for a slight embrittlement. The ether is added to see whether a marked deterioration of the coating results from the added oxygen containing species.

Run 14 is a variation on the theme. In this case the ability of tungsten carbonyl to deposit tungsten on tantalum at temperatures about 500° C. is utilized. It was thought that if a tungsten layer could be deposited on the tantalum at a temperature lower than the cracking temperature of diphenyl, a layer of tungsten carbide could be formed that would prevent excessive penetration of carbon into the tantalum grains. The formed carbide layer is white, probably a tungsten carbide. But there is extensive penetration of grains and grain boundaries by a rather characteristically coarse dispersion of carbides.

TABLE 2

| Number | Carbiding Material | Carbiding Conditions | Coating Thickness, Mils | Metallographic Examination |
|---|---|---|---|---|
| 4 | Graphite rod soaked in diphenyl/acetone solution. | ~$10^{-4}$ mm. cold 5 min.; 400 mm. $H_2$ 2 min. at 1,650° C. | 0.06 | Little diffusion into grains. |
| 5 | Same as above | ~$10^{-4}$ mm. cold 5 min.; 100 mm. $H_2$ 7 min. at 1,650° C. | 0.09 | Excellent throwing power; coherent coating. |
| | | | 0.06 | Little carbide in grains. |
| | | | 0.06 | Good coherent coating; appreciable penetration of grains and boundaries. Widmanstatten structure. |
| 6 | Same as above | ~$10^{-4}$ mm. cold 5 min.; 200 mm. $H_2$ 13 min. at 1,650° C. | 0.07 | Excellent throwing power; coherent coating. |
| | | | 0.10 | Very little carbide penetration into grains. |
| | | | 0.05 | Adherent and coherent coat; some carbide in grains and grain boundaries. Little penetration into grains. |
| 7 | Same as above | ~$10^{-4}$ mm. cold 5 min.; 400 mm. $H_2$ 1,100° C.–1,300° C. 2 min.; 15 min. at 1,650° C. | 0.05 | Similar to 6—¾ in. |
| | | | 0.11 | Similar to 6—2½ in. |
| | | | 0.09 | Similar to 6—3 in. but more carbide penetration. |
| 8 | Same as above | ~$10^{-4}$ mm. cold 5 min.; 2 min., 1,100° C.; 7 min., 1,650° C. For each of 3 sections. | 0.07 | Fair throwing power; some penetration. |
| | | | 0.10 | Good coat; little penetration of grains. |
| | | | 0.09 | |

TABLE 1

| Number | Carbiding Material | Carbiding Conditions | Coating Thickness, Mils | Metallographic Examination |
|---|---|---|---|---|
| 1 | Graphite rod soaked in molten erucic acid. | ~$10^{-4}$ mm., cold 5 min.; 400 mm. $H_2$ heated to 1,650° C. in sections. | | Very thin coat. No penetration. |
| | | | 0.07 | Fairly uniform coat; little penetration. |
| | | | 0.20 | Uniform coat "keyed" to metal; some penetration. |
| | | | 0.12 | Similar to above; less penetration. |
| 2 | Graphite rod soaked in erucic acid plus toluene (3:2). | ~$10^{-4}$ mm. to 1,200° C.; 400 mm. $H_2$ | 0.05 | Fairly uniform coat; little penetration into grains. |
| | | | 0.16 | Uniform looking coat; carbide penetrated grains and boundaries. |
| | | | 0.15 | Similar but less carbide in grains. |
| 3 | Graphite rod soaked in rosin, heated at 250° C. for ½ hr. | ~$10^{-4}$ mm. cold 5 min.; 2 min. at 1,100° C.; 15 min. 1,650° C. pressure controlled.* | 0.06 | Fairly even coating. No penetration into grains. |
| | | | 0.11 | Fair coating; some penetration into grains and boundaries. |
| | | | 0.08 | Similar. |

*Pressure controlled at 400 mm.

TABLE 3

| Number | Carbiding Material | Carbiding Conditions | Coating Thickness, Mils | Metallographic Examination |
|---|---|---|---|---|
| 9 | B50 Graphite soaked in diphenyl/acetone solution. | ~10⁻⁴ mm. cold 5 min.; 400 mm. H₂ zone heated 17 min. at 1,650° C. Cool in H₂. | | Some coating; some carbide in grains |
| | | | 0.07 | |
| | | | 0.06 | Adherent coat; slight penetration of carbide into grains. |
| | | | 0.06 | |
| | | | 0.11 | Coating good, more carbide in grain boundaries. |
| 10 | Graphite rod vacuum impreg. diphenyl/toluene. | ~10⁻⁴ mm. cold 5 min., 400 mm. H₂ 15 min. at 1,650° C. | 0.07 | Rather discontinuous coating. |
| | | | 0.07 | Adherent coating, carbide penetrated grains lightly. |
| | | | 0.08 | Similar but heavier. |
| 11 | Same as above | Same as above | 0.08 | Continuous coating; slight grain penetration. |
| | | | 0.08 | Similar but deeper penetration. |
| | | | 0.19 | Heavier carbide coat; heavier penetration of grains and boundaries. |
| 12 | Graphite soaked in 90% diphenyl plus 10% phenyl ether acetone. | ~10⁻⁴ mm. cold 5 min.; 2 min. at 1,180° C, 15 min. at 1,650° C. Cool under H₂. | 0.04 | Coating seems very brittle; little penetration. |
| | | | 0.05 | Somewhat greater coherence; considerable penetration of grains by carbide. |
| | | | 0.06 | Similar; strong grain boundary segregation. |
| 13 | Same as above | Same as above | ~0.10 | Rather thick, brittle coat; little grain penetration. |
| | | | 0.10 | Coat more coherent; some penetration of grains and boundary. |
| | | | 0.10 | Similar. |
| 14 | Graphite rod soaked in satd. diphenyl plus W(CO)₆/acetone. | ~10⁻⁴ mm. cold 5 min.; preheat to 1,200° C.; 400 mm. H₂ 15 min. at 1,650° C. | 0.09 | Very adherent coating. |
| | | | 0.20 | |
| | | | 0.33 | Coarse looking. |
| | | | 0.17 | |
| | | | 0.23 0.28 | |

Other materials, such as straight chain hydrocarbons, long chain fatty acids, condensed rings, chains of rings and polymeric oxygen containing rings (furfuryl alcoholic polymers) are also soaked into spectroscopic graphite rods. For example, the hydrocarbon material Octoil, beeswax, polyethylene, polymerized furfuryl alcohol, terphenyl, and anthracene are utilized in runs performed according to the standard conditions. The graphite sponge, due to its high specific heat (a factor of ten times that of tantalum) remains at a somewhat lower temperature during the induction heating than the tantalum tube and gives up its organic content at a rate slower than the rate of carbide formation. Diphenyl seems to be the most satisfactory material.

What is claimed is:

1. A method of carburizing the inside surface of a tantalum tube closed at one end comprising soaking an organic compound into a porous graphite rod, said graphite rod being of smaller diameter than the inside diameter of the tantalum tube, inserting said graphite rod into the tantalum tube and inductively heating under vacuum conditions.

2. A method as in claim 1 wherein a partial pressure of hydrogen is present and heating was performed at about 1100° C. for about two minutes and thereafter at about 1650° C. for about 15 minutes.

3. A method as in claim 2 wherein the partial pressure of hydrogen is about 400 mm.

4. A method as in claim 1 wherein the organic material is selected from the class consisting of straight chain hydrocarbons, long chain fatty acids, condensed rings, chains of rings and polymeric oxygen containing rings.

5. A method as in claim 1 wherein the organic material is a long chain fatty acid containing more than 12 carbon atoms.

6. A method as in claim 5 wherein the long chain fatty acid is erucic acid.

7. A method as in claim 1 wherein the organic material is diphenyl.

8. A method as in claim 7 wherein the diphenyl is present with acetone.

References Cited

UNITED STATES PATENTS

| 2,804,411 | 8/1957 | Anderson et al. | 148—16.5 |
| 3,042,557 | 7/1962 | Chenault | 148—19 |
| 3,163,563 | 12/1964 | Douglass et al. | 148—39 |
| 3,265,540 | 8/1966 | Foley | 148—32 |

CHARLES N. LOVELL, *Primary Examiner.*

U.S. Cl. X.R.

117—97, 46; 148—13.1